United States Patent [19]

Takahashi

[11] Patent Number: 5,185,168
[45] Date of Patent: Feb. 9, 1993

[54] METHOD FOR OPERATING A REDUCED-PRESSURE MULTI-FRYER SYSTEM

[75] Inventor: Kazuo Takahashi, No. 38-22, Kitazawa 5-chome, Setagaya-ku, Tokyo, Japan

[73] Assignees: Kazuo Takahashi, Tokyo; Mitsubishi Corporation, Tokyo; Mutsu Seika Co., Ltd., Hirosaki, all of Japan; part interest to each

[21] Appl. No.: 742,020

[22] Filed: Aug. 8, 1991

[30] Foreign Application Priority Data

Apr. 2, 1991 [JP] Japan .................................. 3-096196

[51] Int. Cl.⁵ .............................................. A23L 1/00
[52] U.S. Cl. ...................................... 426/233; 426/438
[58] Field of Search ............... 426/231, 233, 438, 439; 99/403

[56] References Cited

U.S. PATENT DOCUMENTS 4,985,266  1/1991  Sakuma ............................... 426/438

FOREIGN PATENT DOCUMENTS 62-40252  2/1987  Japan .

*Primary Examiner*—George Yeung
*Attorney, Agent, or Firm*—Oblon, Spivak, McClelland, Maier & Neustadt

[57] ABSTRACT

A method for operating a plural number of batch type reduced-pressure fryer units, the method including: connecting the fryer units, through a switch means, with vacuum pump lines including an initial vacuum pump line serving to reduce the frying bath pressure of a selected one of the fryer units in the stage of an initial frying treatment and a finish vacuum pump line serving to maintaining the frying baths of a plural number of the frying units simultaneously in reduced pressure condition in the stage of a finish frying treatment; while holding the respective vacuum pump lines in operation, switching the vacuum pump lines to connect the initial vacuum pump line with a selected fryer unit to reduce the pressure of the frying bath thereof for the initial frying treatment; switching the vacuum pump line to connect the selected fryer unit with the finish vacuum pump line for the finish frying treatment upon completion of the initial frying treatment; switching the vacuum pump lines to disconnect the selected fryer unit from the vacuum pump lines upon completion of the finish frying treatment; and repeating the switching operation sequentially and cyclically for each one of the fryer units in a predetermined timing.

5 Claims, 6 Drawing Sheets

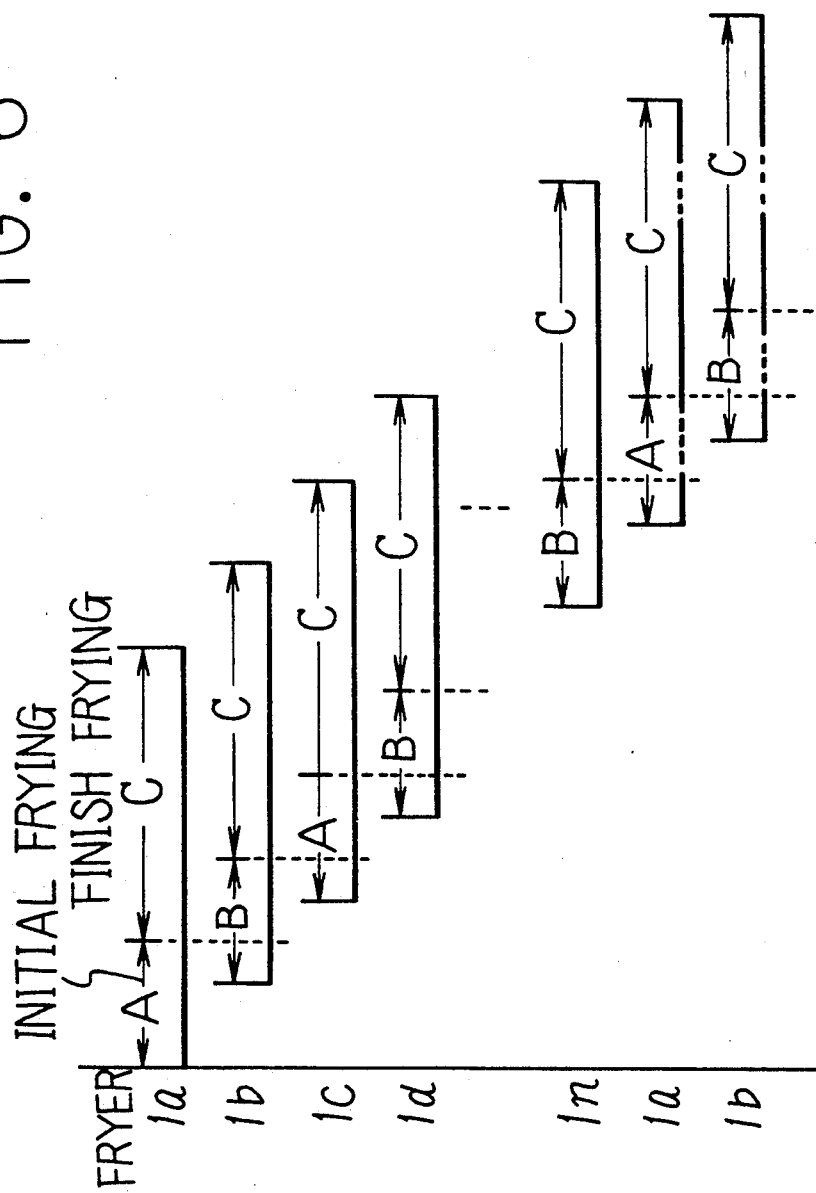

METHOD FOR OPERATING A REDUCED-PRESSURE MULTI-FRYER SYSTEM

BACKGROUND OF THE INVENTION

1. Field of the Art

This invention relates to a reduced-pressure fryer system for producing fried food products from various kinds of vegetables, fruits, sea products and live-stock products or molded or shaped products of such food stuff and a method for operating the reduced-pressure multi-fryer system, and more particularly to a reduced-pressure fryer system which is arranged to operate a plural number of batch type reduced-pressure fryers efficiently by the use of a vacuum generating means with a smaller number of vacuum pump lines, and an operating method therefor.

2. Description of the Prior Art

Generally, when producing fried food products by the use of a batch type reduced-pressure fryer, it is the usual practice to connect the fryer to a vacuum generating means which is constituted by a vacuum pump, a condenser etc., placing a basket, which holds the food material to be fried, in a frying bath while adjusting the amount and temperature of oil in the frying bath and reducing the pressure of the frying bath through the vacuum generating means, immersing and frying the food material in heated oil for a predetermined time period, lifting up the fried product after relieving the reduced pressure, and feeding fresh food material to the frying bath to repeat the same frying operation.

In a case where a plural number of reduced-pressure fryers are used for the production of fried food, the general practice has been to connect each fryer to one of vacuum generating means which are provided exclusively for the respective fryers for independent frying operations. It follows that there have to be provided frying equipments of extremely large scale due to the necessity for incorporating a large number of vacuum generating means exclusively for the respective fryers, requiring an objectionably large installation space in addition to increases in equipments and production costs.

SUMMARY OF THE INVENTION

It is therefore an object of the present invention to provide a reduced-pressure multi-fryer system which can operate a plural number of fryers efficiently by the use of a smaller number of vacuum generating means, and an operating method for such a fryer system.

In accordance with the present invention, there is provided, for achieving the above-stated objective, a reduced-pressure multi-fryer system which essentially includes: a plural number of fryers each having a frying bath of pressure-resistant construction for immersing and frying food material in heated oil under reduced pressure; and vacuum generating means for reducing the pressure of the fryers, the vacuum generating means having a number of vacuum pump lines including an initial vacuum pump line for reducing the pressure of one of the fryers in the stage of an initial frying treatment and a finish vacuum pump line for maintaining a plural number of the fryers concurrently in reduced pressure condition in the stage of a finish frying treatment subsequent to the initial frying treatment, the vacuum pump lines being smaller than the number of the fryers in total number and sequentially connectible to the respective fryers in a predetermined timing by operation of switch valves.

Each fryer is provided with a heater for heating the oil in the frying bath and an oil circulating passage with an oil strainer and a stirring pump, constantly stirring the heated oil by circulation through the oil circulating passage.

The initial vacuum pump line for the initial frying treatment and the finish vacuum pump line for the finish frying treatment are constituted by a vacuum pump, a separator located upstream of the vacuum pump to separate and collect oil mist in suction air, and a cooling means for condensing water vapors in the suction air.

Preferably, the frying bath of each fryer is provided with a vacuum signal transmitter or vacuum sensor which is adapted to produce an output signal varying commensurate with the vacuum level in the frying bath to switch the connection of the vacuum pump line from the initial vacuum pump line to the finish vacuum pump line according to the variation in the vacuum pressure level detected by the vacuum sensor.

Further, the finish and initial vacuum pump lines may be arranged to generate vacuum pressures of the same level. However, in a preferred embodiment, the finish vacuum pump line is arranged to generate a higher vacuum pressure.

Furthermore, desirably the reduced-pressure multi-frying system is operated automatically according to programmed routines under control of a microcomputer.

In accordance with the present invention, there is also provided a method of operating a plural number of reduced-pressure fryer units each having a frying bath for immersing and frying food material in heated oil, the method including: connecting the fryer units, through a switch means, with vacuum pump lines including an initial vacuum pump line serving to reduce the frying bath pressure of one of the fryer units in the stage of an initial frying treatment and a finish vacuum pump line serving to maintain the frying baths of a plural number of frying units simultaneously in reduced pressure condition in the stage of a finish frying treatment; while holding the respective vacuum pump lines in operation, switching the vacuum pump lines to connect the initial vacuum pump line with one fryer unit to reduce the pressure of the frying bath thereof for the initial frying treatment; switching the vacuum pump lines to connect the fryer unit with the finish vacuum pump line for the finish frying treatment upon completion of the initial frying treatment; switching the vacuum pump lines to disconnect the fryer unit from the vacuum pump lines upon completion of the finish frying treatment; and repeating the switching operation sequentially and cyclically for each one of the fryer units in a predetermined timing to operate a plural number of fryer units by the use of a smaller number of vacuum pump lines.

In this instance, it is desirable to detect variations in vacuum level of each fryer unit and to switch the connection with the vacuum pump line from the initial vacuum pump line to the finish vacuum pump line according to a variation in vacuum level resulting from release of steam from the food material being fried. More specifically, it is desirable to switch the vacuum pump line at a time point when the vacuum pressure in the frying bath restores, after a drop due to the release of steam from the food material, a value slightly lower than the initial vacuum pressure at the start of the initial frying treatment.

Normally, the vacuum pressure in the finish frying treatment is preset at a level same as or higher than that of the initial frying treatment.

In a preferred embodiment, the reduced-pressure multi-fryer system is operated automatically according to programmed routines under control of a microcomputer.

BRIEF DESCRIPTION OF THE DRAWINGS

In the accompanying drawings:

FIG. 6 is a time chart explanatory of an operating method for the reduced-pressure multi-fryer system as shown in FIG. 5.

DESCRIPTION OF PREFERRED EMBODIMENTS

Figure 1:
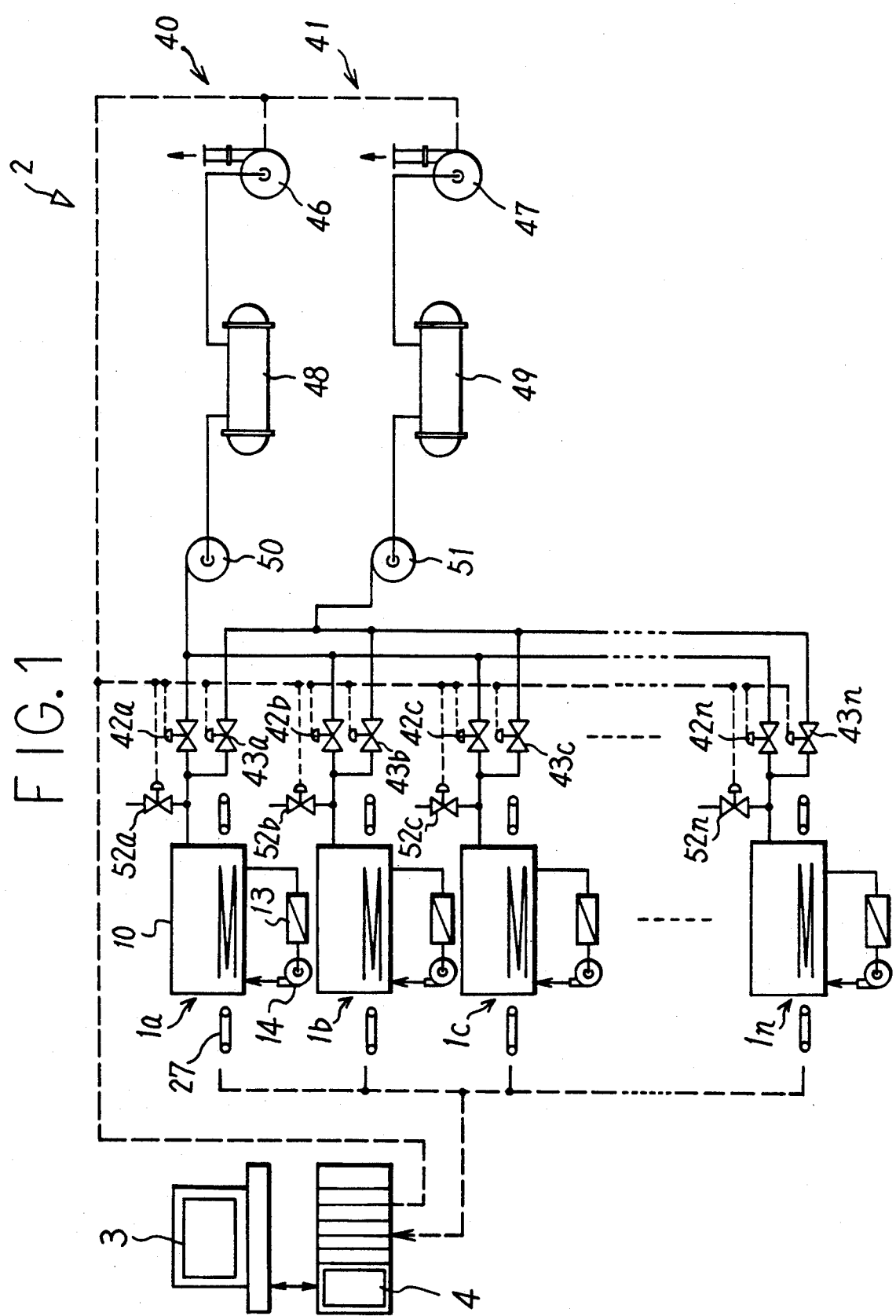
FIG. 1 is a diagrammatic illustration showing the arrangement in a first embodiment of the reduced-pressure multi-fryer system according to the present invention.

Referring to FIG. 1, there is shown a first embodiment of the reduced-pressure multi-fryer system according to the present invention, in which the reference characters $1a$ to $1n$ denote a plural number of batch type reduced-pressure fryer units employed for the production of fried food products, and the reference 2 denotes a vacuum generating means for reducing the pressure of the respective fryer units.

Figure 2:
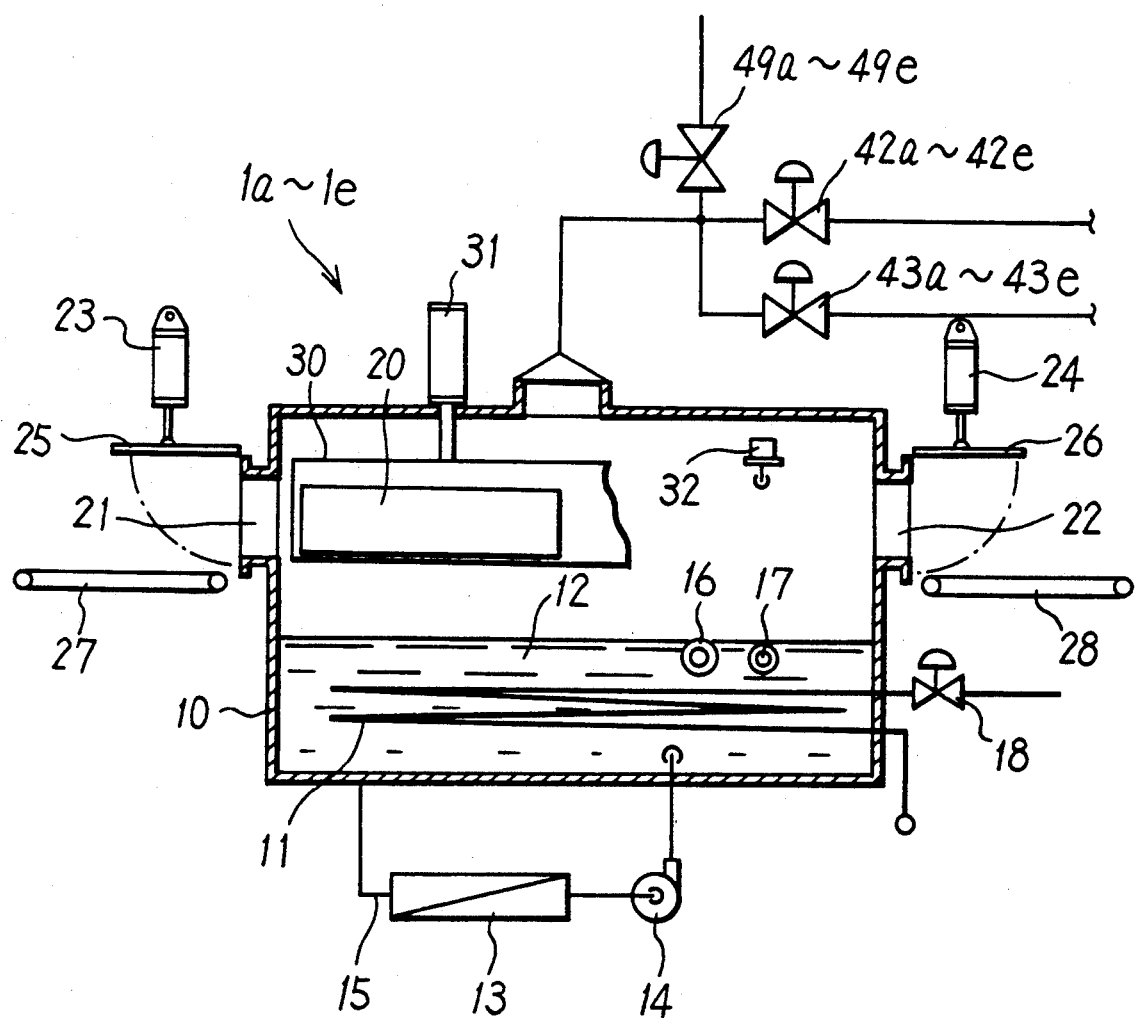
FIG. 2 is a diagrammatic illustration showing the construction of a fryer unit.

As shown particularly in FIG. 2, the fryer units $1a$ to $1n$ are each provided with a heater 11 within a frying bath 10 of pressure-resistant construction, the heater 11 using steam as a heat source for heating up oil 12 in the frying bath 10 to a predetermined temperature. The oil 12 in the frying bath is constantly maintained in stirred state by circulation through an oil circulating passage 15 with an oil strainer 13 and a stirring pump 14. Indicated at 16 is an oil level sensor which detects the amount of oil in the frying bath, and at 17 is a thermosensor which detects the oil temperature.

The frying bath 10 is provided with an inlet opening 21 and an outlet opening 22 for admission and ejection of a basket 20 which contains food material. The inlet and outlet openings 21 and 22 are normally hermetically closed by sealing doors 25 and 26 which are connected to cylinders 23 and 24, respectively. Conveyers 27 and 28 are provided on the outer side of the inlet and outlet openings 21 and 22, respectively. The basket 20 which has been fed to the frying bath 10 by the conveyer 27 is supported on a lift member 30 which is supported on a lift drive means such as a cylinder 31 vertically movably within the housing of the frying bath 10. In a frying operation, the lift member 30 is lowered to immerse the basket 20 in the oil 12. Further provided in the frying bath 10 is a vacuum sensor 32 which is arranged to measure the vacuum level of the bath and transmit a signal of the detected vacuum level to a microcomputer 3 which operates the reduced-pressure multi-fryer system according to a given program. The reference numeral 4 in FIG. 1 denotes an interface.

On the other hand, as shown also in FIG. 1, the vacuum generating means 2 includes an initial vacuum pump line 40 which serves to reduce the pressure of one fryer unit in the stage of an initial frying treatment, and a finish vacuum pump line 41 which serves to maintain a plural number of fryer units simultaneously in reduced pressure condition in the stage of a finish frying treatment. These vacuum pump lines 40 and 41 are connectible to the respective fryer units $1a$ to $1n$ through switch valves $42a$ to $42n$ and $43a$ to $43n$, respectively, and are sequentially and cyclically connected to the fryer units $1a$ to $1n$ in a predetermined timing by operations of the switch valves $42a$ to $42n$ and $43a$ to $43n$ under control of the microcomputer 3. The total number of the initial and finish vacuum pump lines 40 and 41 is smaller than the total number of the fryer units $1a$ to $1n$.

The initial and finish vacuum pump lines 40 and 41 are provided with vacuum pumps 46 and 47, separators 48 and 49 located upstream of the vacuum pumps 46 and 47 to separate and collect oil mist in suction air, and cooling means 50 and 51 for condensing steam in suction air, respectively.

Vacuum relief valves $52a$ to $52n$ are provided in the conduits which communicate the switch valves $42a$ to $42n$ and $43a$ to $43n$ with the fryer units $1a$ to $1n$, respectively, each one of the vacuum relief valves $52a$ to $52n$ being selectively opened upon completion of a frying operation to restore atmospheric pressure in the frying bath 10.

The reduced-pressure multi-fryer system of the above construction is operated automatically under control of the microcomputer 3, for example, in the manner as follows.

In a preparatory stage of the operation, the oil 12 in the frying bath 10 of each one of the fryer units $1a$ to $1n$ is heated by the heater 11 and adjusted to a predetermined temperature by controlling the steam regulator valve 18 according to the output signal of the thermosensor 17, while maintaining a predetermined amount of oil in the bath 10 according to the output signal of the oil 12 level sensor 16 and forcibly circulating the oil 13 by the stirring pump 14 through the oil circulating passage 15 via oil strainer 13 to hold the oil constantly in stirred state. As a result, the oil temperature becomes uniform throughout the frying bath 10. Namely, when heating the oil 12 by the heater 11 which is located within the frying bath 10, the oil temperature would be elevated only in the regions around the heater 11 unless the oil 12 is constantly stirred by the forced circulation as described above.

On the other hand, the vacuum pumps 46 and 47 in the initial and finish vacuum pump lines 40 and 41 are put in continuous operation.

In this state, a metal basket 20 which contains food material is fed to the frying bath 10 of the first fryer unit $1a$, and, as soon as the frying bath 10 is hermetically closed, the switch valve $42a$ is opened, connecting the fryer unit $1a$ with the initial vacuum pump line 40 to start the pressure reduction of the first fryer unit $1a$.

Figure 3:
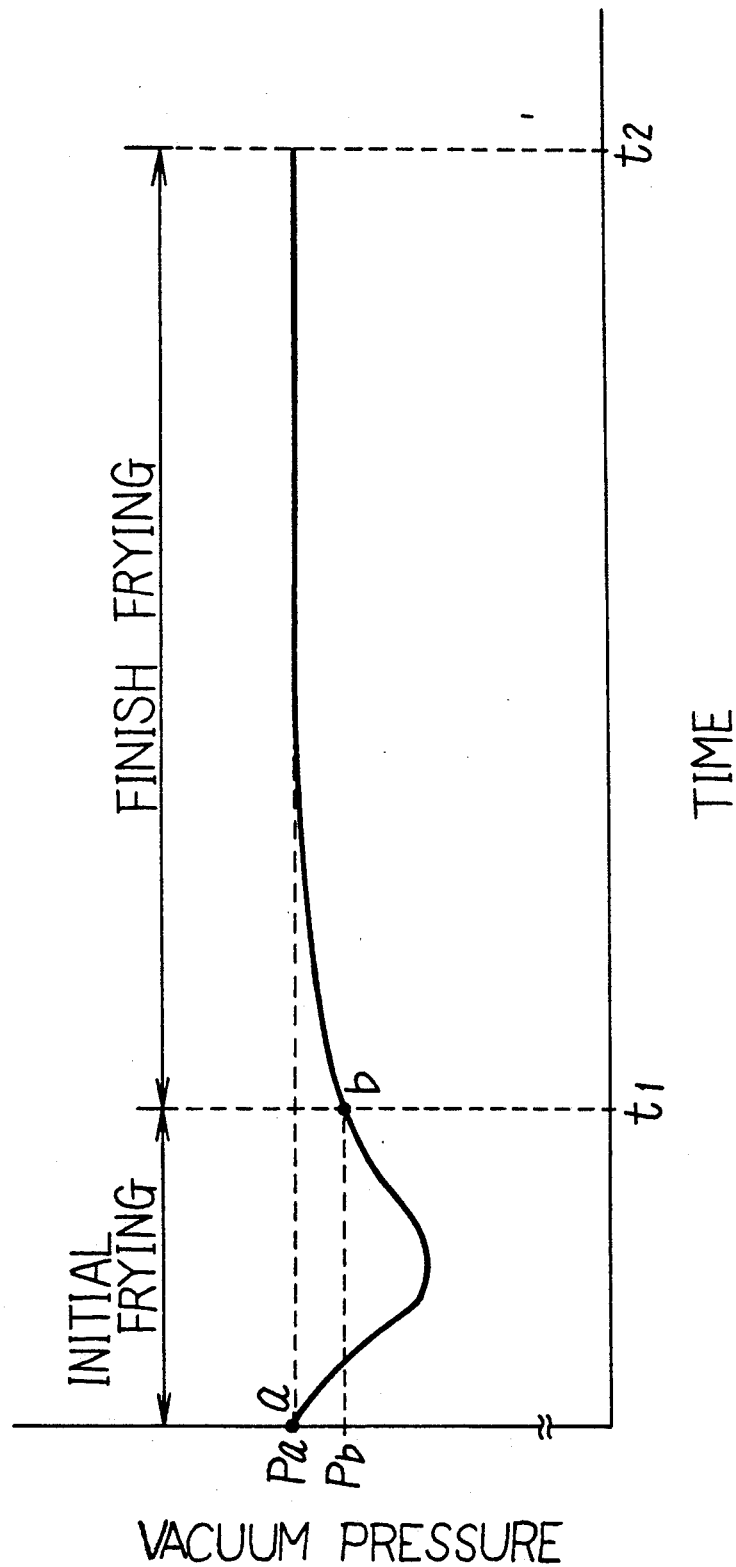
FIG. 3 is a diagram plotting variations in vacuum pressure during a frying operation.

The pressure in the frying bath 10 is constantly measured by the vacuum sensor 32, and the output signal of the vacuum sensor 32 is fed to the microcomputer 3. Upon the amount and temperature of the oil reaching predetermined values for initiation of the frying operation and, as shown in FIG. 3, the vacuum pressure in the frying bath 10 reaching a predetermined value Pa at the point a, the rod of the cylinder 31 is lowered to immerse the basket 20 on the lift member 30 in the heated oil 12 to effect an initial frying treatment for a certain time period. At this time, as soon as the food material is immersed in the oil 12, the moisture content in the food material is abruptly evaporated. As a result, the vacuum pressure in the frying bath 10 is lowered temporarily. However, as the amount of evaporation decreases, the vacuum pressure starts to increase again.

At a time point when the vacuum pressure reaches a predetermined level, namely, at the point b where the vacuum pressure restores a value Pb slightly lower than the vacuum pressure Pa at the start of the initial frying operation, the switch valve 42a is closed and instead the switch valve 43a is opened, disconnecting the fryer unit 1a from the initial vacuum pump line 40 and connecting same with the finish vacuum pump line 41 to carry out a finish frying treatment for a certain period of time. In this stage of finish frying treatment, the food material gradually dries up by release of steam, so that the vacuum pressure in this stage is set substantially at the same level as the vacuum pressure Pa at the start of the initial frying treatment.

The time $t_1$ for the initial frying treatment and the time $t_2$ for the entire frying treatment are almost invariable as long as the frying conditions such as the kind and amount of the food material, oil temperature, vacuum pressure level etc. are constant. Accordingly, the switching from the initial vacuum pump line 40 to the finish vacuum pump line 41 may be effected by a time-base control irrespective of the vacuum pressure of the frying bath.

The above-described frying treatments are carried out in the circulated oil, which stirs the food material in the basket 20 to a suitable degree, so that it is not necessarily required to vibrate the basket 20 in the oil. However, depending upon the frying conditions such as the nature or amount of the food material to be fried, arrangements may be made to vibrate the basket 20 in vertical or lateral directions in fully or half immersed state in the oil.

Figure 4:
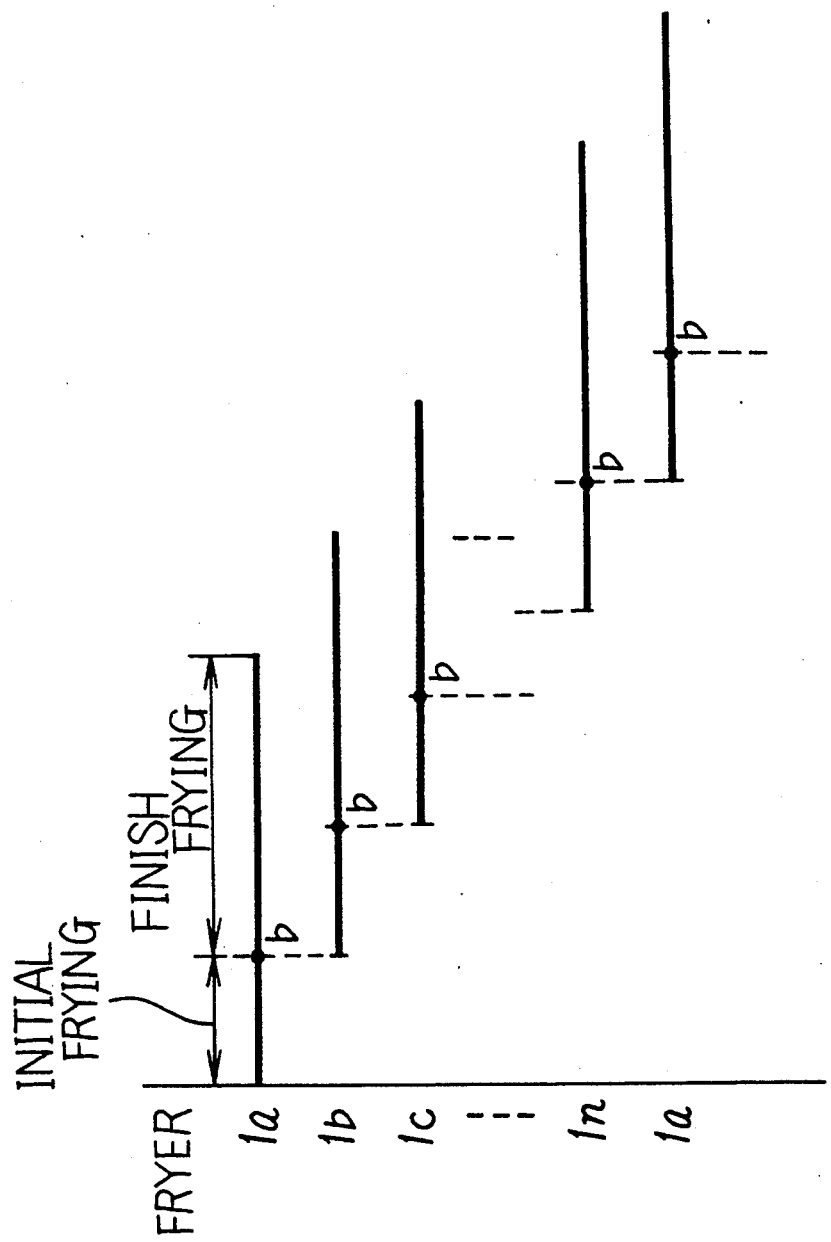
FIG. 4 is a time chart explanatory of an operating method for the reduced-pressure multi-fryer system as shown in FIG. 1.

On the other hand, the initial vacuum pump line 40 which has been disconnected from the first fryer unit 1a, is then connected with the second fryer unit 1b by opening the switch valve 42b as shown in FIG. 4 to repeat the initial frying treatment in the second fryer unit 1b in the same manner as in the first fryer unit 1a described above, thereafter sequentially repeating the same operation for the succeeding fryer units 1c to 1n.

In the next place, upon lapse of a predetermined time period after the connection of the first fryer unit 1a with the finish vacuum pump line 41 or upon completion of the finish frying treatment in the first fryer unit 1a, the basket 20 is lifted up out of the oil, followed by a predetermined time period of oil draining to complete one frying operation.

Upon completion of a frying operation, the switch valve 43a is closed and simultaneously the vacuum relief valve 52a is opened to restore the atmospheric pressure in the frying bath 10. Succeedingly, the food outlet 22 and inlet 21 are opened to receive a basket 20 of fresh food material through the inlet 21 while ejecting the basket 20 of the fried food material through the outlet 22, holding the first fryer unit 1a in a stand-by state.

Then, at the time point b when the n-th fryer 1n is disconnected from the initial vacuum pump line 40, the first fryer 1a is connected with the initial vacuum pump line 40 again to start the initial frying treatment in the first fryer unit 1a. Thereafter, a predetermined initial frying treatment is sequentially and cyclically repeated for each one of the fryer units 1a to 1n.

The above-described embodiment employs the initial and finish vacuum pump lines 40 and 41 of the same capacity, maintaining in the finish frying treatment a vacuum pressures which is substantially same as the vacuum pressure level at the start of the initial frying treatment. However, if desired, arrangements may be made to increase the vacuum pressure in the finish frying treatment to a level higher than the vacuum pressure Pa at the start of the initial frying treatment, by employing a finish vacuum pump line 41 of a higher capacity.

Thus, according to the present invention, a plural number of batch type reduced-pressure fryers 1a to 1n are continuously and efficiently operated in an overlapped fashion by the use of a smaller number of vacuum pump lines 40 and 41.

Figure 5:
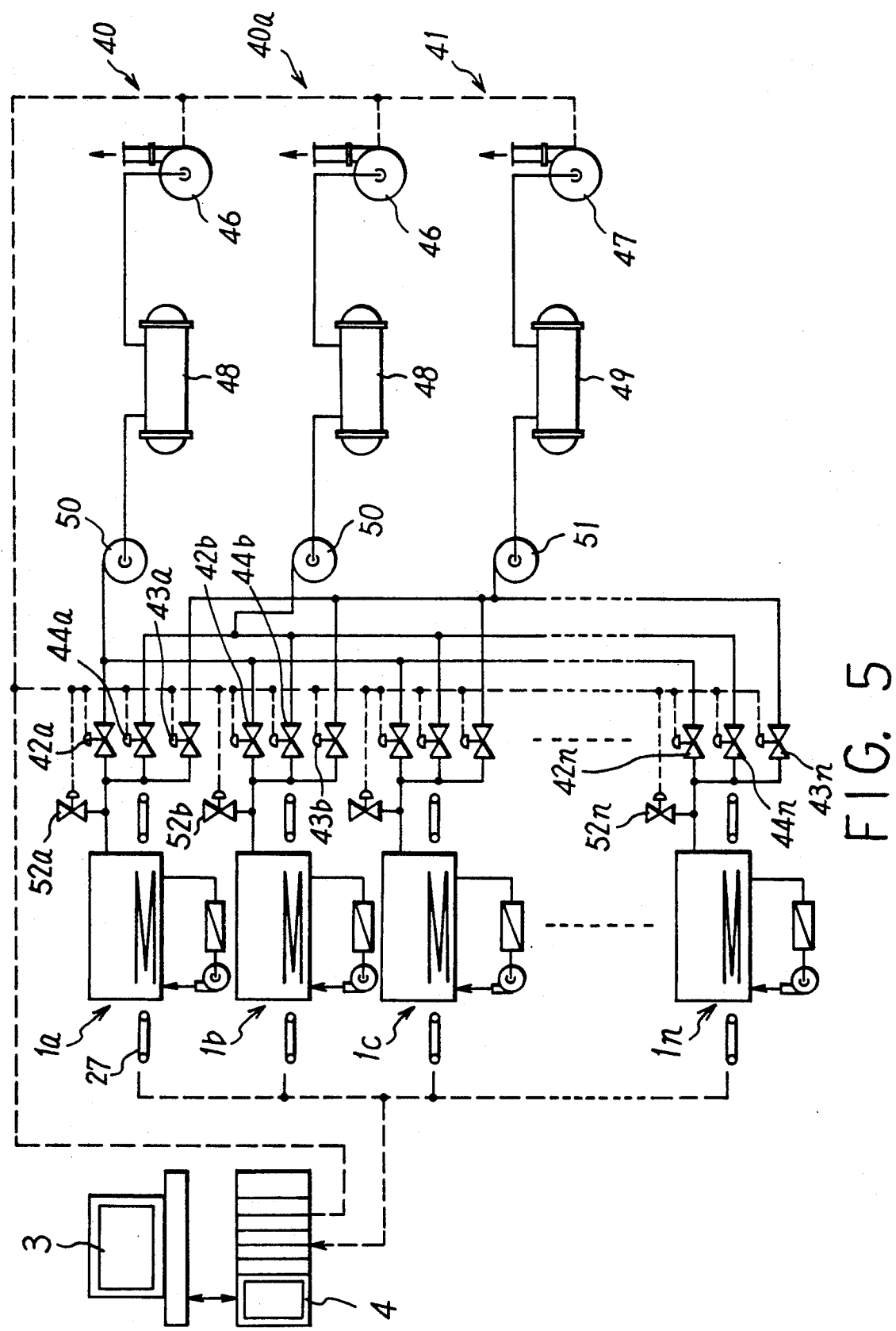
FIG. 5 is a view similar to FIG. 1 but showing a second embodiment of the reduced-pressure multi-fryer system of the invention.

The system may employ a plural number of the initial vacuum pump lines 40 or finish vacuum pump lines 41 as long as the total number of the vacuum pump lines is smaller than the total number of the fryer units. A second preferred embodiment of the invention, shown in FIG. 5, exemplifies a vacuum generating means 2 which is constituted by a plural number of initial vacuum pump lines 40 and 40a and a single finish vacuum pump line 41. More specifically, in the second embodiment, another initial vacuum pump line 40a is added to the vacuum pump line arrangement of the first embodiment, such that the additional vacuum pump line 40a is connectible with the respective reduced-pressure fryer units 1a to 1n through switch valves 44a to 44n. Since, except for the additional vacuum pump line, the second embodiment is same as the foregoing first embodiment in construction, its component parts are designated by the same reference characters and their description is omitted to avoid repetitions.

More specifically, in the second embodiment, a plural number of initial vacuum pump lines 40 and 40a are alternately connected to the respective fryer units 1a to 1n for a frying treatment. Namely, as shown in FIG. 6, after the first initial vacuum pump line 40 has been connected to the first fryer unit 1a to start an initial frying treatment, the second initial vacuum pump line 40a is connected to the second fryer unit 1b with a certain time interval to start an intial frying treatment in the fryer unit 1b. The first and second fryers 1a and 1b are successively disconnected from the initial vacuum pump line at the point b at the end of the initial frying treatment, and connected with the finish vacuum pump line 41 to carry out a finish frying treatment. On the other hand, the initial vacuum pump lines 40 and 40a which have been disconnected from the fryer units 1a and 1b are successively connected with the third and fourth fryer units 1c and 1d in a predetermined timing to repeat the same treatment. Upon completing the frying treatment in the n-th fryer unit 1n, the operation goes back to the first and second fryer units 1a and 1b to repeat the same frying treatment. In this manner, a predetermined frying treatment is sequentially and cyclically repeated for each of the fryer units 1a to 1n.

The numbers of the initial and finish vacuum pump lines are determined in consideration of the vacuum pump capacity and the number of the fryer units etc.

In the foregoing embodiments, the frying treatment is not necessarily repeated in the order of the fryer units 1a to 1n, which can be changed depending upon operating conditions. Namely, in a case where the start of the frying operation needs to be delayed with regard to certain fryer units which are in stand-by state for some reason, for example, for not having reached a preset value in oil amount, oil temperature or vacuum pressure level on starting the frying operation of the whole system, it is possible to select automatically a number of fryer units which are ready for the frying operation, and to start the operation by sequentially connecting the selected fryers with an initial vacuum pump line under control of the microcomputer.

Although the whole system is operated automatically by means of the microcomputer in the foregoing embodiments, it should be understood that all of or part of the operation can be carried out manually if desired.

Thus, according to the present invention, a plural number of batch type reduced-pressure fryers can be operated continuously and effectively in an overlapped fashion by the use of a smaller number of vacuum generating means.

What is claimed is:

1. A method of operating a plural number of reduced-pressure fryer units each having a frying bath for immersing and frying food material in heated oil, the method including:

connecting said fryer units, through a switch means, with vacuum pump lines including an initial vacuum pump line serving to reduce the frying bath pressure of one of said fryer units in the stage of an initial frying treatment and a finish vacuum pump line serving to maintain the frying baths of a plural number of said frying units simultaneously in reduced pressure condition in the stage of a finish frying treatment;

while holding the respective vacuum pump lines in operation, switching said vacuum pump lines to connect said initial vacuum pump line with a selected fryer unit to reduce the pressure of the frying bath thereof for the initial frying treatment;

switching the vacuum pump lines to connect said selected fryer unit with said finish vacuum pump line for the finish frying treatment upon completion of the initial frying treatment;

switching said vacuum pump lines to disconnect said selected fryer unit from the vacuum pump lines upon completion of said finish frying treatment; and repeating the switching operation sequentially and cyclically for each one of the fryer units in a predetermined timing to operate a plural number of fryer units by the use of a smaller number of vacuum pump lines.

2. A method of operating a plural number of reduced-pressure fryer units as defined in claim 1, further comprising detecting variations in vacuum level of each fryer, and switching the connection with said vacuum pump lines from said initial vacuum pump line to said finish vacuum pump line on the basis of a variation in vacuum level resulting from release of steam from said food material.

3. A method of operating a plural number of reduced-pressure fryer units as defined in claim 2, wherein the connection with said vacuum pump lines is switched at a time point when the vacuum pressure in said fryer restores, after a drop due to said release of steam from said food material, a value slightly lower than an initial vacuum pressure at the start of said initial frying treatment.

4. A method of operating a plural number of reduced-pressure fryer units as defined in claim 1, wherein the vacuum pressure in said finish frying treatment is set at a level same as or higher than the vacuum pressure in said initial frying treatment.

5. A method of operating a plural number of reduced-pressure fryer units as defined in claim 1, wherein said fryer units are operated automatically according to a programmed routine under control of a microcomputer.

* * * * *